United States Patent
Chen et al.

(10) Patent No.: US 12,478,685 B2
(45) Date of Patent: Nov. 25, 2025

(54) METHODS AND KITS FOR IDENTIFYING SUBJECTS RESPONSIVE TO ARGININE DEPRIVATION THERAPY

(71) Applicant: POLARIS PHARMACEUTICALS. INC., San Diego, CA (US)

(72) Inventors: Hung-Wen Chen, Taipei (TW); Hui-Fen Liu, Taipei (TW); Chau-Ting Yeh, Taoyuan (TW); Yu-De Chu, Taoyuan (TW); Chun-Hung Chou, Taipei (TW)

(73) Assignee: POLARIS PHARMACEUTICALS. INC., San Diego, CA (US)

( * ) Notice: Subject to any disclaimer, the term of this patent is extended or adjusted under 35 U.S.C. 154(b) by 227 days.

(21) Appl. No.: 18/038,606

(22) PCT Filed: Apr. 14, 2022

(86) PCT No.: PCT/US2022/024867
§ 371 (c)(1),
(2) Date: May 24, 2023

(87) PCT Pub. No.: WO2022/221566
PCT Pub. Date: Oct. 20, 2022

(65) Prior Publication Data
US 2024/0000952 A1 Jan. 4, 2024

Related U.S. Application Data

(60) Provisional application No. 63/174,851, filed on Apr. 14, 2021.

(51) Int. Cl.
A61K 47/60 (2017.01)
A61K 45/06 (2006.01)
(Continued)

(52) U.S. Cl.
CPC .............. *A61K 47/60* (2017.08); *A61K 45/06* (2013.01); *A61P 35/00* (2018.01); *C12Q 1/6886* (2013.01); *C12Q 2600/156* (2013.01)

(58) Field of Classification Search
CPC ................................. A61K 47/60; A61P 35/00
(Continued)

(56) References Cited

FOREIGN PATENT DOCUMENTS

| WO | WO-2015/051340 A1 | 4/2015 |
|----|-------------------|--------|
| WO | WO-2019/217486 A1 | 11/2019 |

OTHER PUBLICATIONS

Brahmi, Mehdi et al., "KIT exon 10 variant (c.1621 A > C) single nucleotide polymorphism as predictor of GIST patient outcome," BMC Cancer, Oct. 24, 2015, 8 pages, vol. 15, Issue No. 1, Biomed Central, London, GB.

(Continued)

*Primary Examiner* — Robert B Mondesi
(74) *Attorney, Agent, or Firm* — MUNCY, GEISSLER, OLDS & LOWE, P.C.

(57) ABSTRACT

Disclosed herein are methods and kits for identifying responsiveness or non-responsiveness of a cancer subject to arginine deprivation therapy. The method includes determining the presence of a G/G genotype of rs13338697 of the target nucleic acid in a biological sample derived from the subject by use of a polymerase chain reaction (PCR)-based method, in which the presence of the G/G genotype of rs13338697 of the target nucleic acid is an indication that the subject is responsive to the arginine deprivation therapy.

5 Claims, 6 Drawing Sheets

Specification includes a Sequence Listing.

(51) Int. Cl.
*A61P 35/00* (2006.01)
*C12Q 1/6886* (2018.01)

(58) Field of Classification Search
USPC .......................................................... 424/94.6
See application file for complete search history.

(56) References Cited

OTHER PUBLICATIONS

Lin, Wey-Ran, et al., "Combinations of single nucleotide polymorphisms WWOX -rs13338697, GALNT14 -rs9679162 and rs6025211 effectively stratify outcomes of chemotherapy in advanced hepatocellular carcinoma," Asia-Pacific Journal of Clinical Oncology, Apr. 1, 2018, Web Apr. 14, 2018, 2 pages. John Wiley & Sons, Inc, Hoboken, USA (XP-055980651).

SEQUENCE LISTING

<160> NUMBER OF SEQ ID NOS: 9

<210> SEQ ID NO 1
<211> LENGTH: 20
<212> TYPE: DNA
<213> ORGANISM: Artificial Sequence
<220> FEATURE:
<223> OTHER INFORMATION: Synthetic

<400> SEQUENCE: 1
acttctgaca gccatccaga                                              20

<210> SEQ ID NO 2
<211> LENGTH: 20
<212> TYPE: DNA
<213> ORGANISM: Artificial Sequence
<220> FEATURE:
<223> OTHER INFORMATION: Synthetic

<400> SEQUENCE: 2
atcctgctag catgttgact                                              20

<210> SEQ ID NO 3
<211> LENGTH: 20
<212> TYPE: DNA
<213> ORGANISM: Artificial Sequence
<220> FEATURE:
<223> OTHER INFORMATION: Synthetic

<400> SEQUENCE: 3
actgtagatg ccttccatct                                              20

<210> SEQ ID NO 4
<211> LENGTH: 20
<212> TYPE: DNA
<213> ORGANISM: Artificial Sequence
<220> FEATURE:
<223> OTHER INFORMATION: Synthetic

<400> SEQUENCE: 4
acattcacag agaacttggc                                              20

<210> SEQ ID NO 5
<211> LENGTH: 20
<212> TYPE: DNA
<213> ORGANISM: Artificial Sequence
<220> FEATURE:
<223> OTHER INFORMATION: Synthetic

<400> SEQUENCE: 5
caagcagtcc ttccaccttg                                              20

<210> SEQ ID NO 6
<211> LENGTH: 20
<212> TYPE: DNA
<213> ORGANISM: Artificial Sequence
<220> FEATURE:
<223> OTHER INFORMATION: Synthetic

```
<400> SEQUENCE: 6
aaagtgctgg gattacaggt                                          20

<210> SEQ ID NO 7
<211> LENGTH: 20
<212> TYPE: DNA
<213> ORGANISM: Artificial Sequence
<220> FEATURE:
<223> OTHER INFORMATION: Synthetic

<400> SEQUENCE: 7
tcacgaggcc aacattctag                                          20

<210> SEQ ID NO 8
<211> LENGTH: 20
<212> TYPE: DNA
<213> ORGANISM: Artificial Sequence
<220> FEATURE:
<223> OTHER INFORMATION: Synthetic

<400> SEQUENCE: 8
ttagattctg catggctcac                                          20

<210> SEQ ID NO 9
<211> LENGTH: 21
<212> TYPE: DNA
<213> ORGANISM: Artificial Sequence
<220> FEATURE:
<223> OTHER INFORMATION: Synthetic

<400> SEQUENCE: 9
tccctcctac tgaacctctc c                                        21
```

METHODS AND KITS FOR IDENTIFYING SUBJECTS RESPONSIVE TO ARGININE DEPRIVATION THERAPY

CROSS REFERENCE TO RELATED APPLICATIONS

This application is a national stage of PCT international Application No. PCT/US2022/024867, filed on Apr. 14, 2022 and published in English on Oct. 20, 2022 with the Publication No. WO 2022/221566A1, which claims priority and the benefit of U.S. Provisional Patent Application No. 63/174,851, filed Apr. 14, 2021, the entirety of which is incorporated herein by reference.

BACKGROUND OF THE INVENTION

1. Field of the Invention

The present disclosure in general relates to methods and kits for identifying single nucleotide polymorphisms (SNPs) associated with tumors. Particularly, the present disclosure relates to uses of the identified SNPs for the prognosis on whether a patient suffering from a tumor will respond to arginine deprivation therapy.

2. Description of Related Art

Certain cancers may be auxotrophic for a particular amino acid, and amino acid deprivation is one method to treat these tumors. Arginine deprivation is a novel approach for treating tumors. Arginine can be degraded by several enzymes including arginine deiminase (ADI). Although ADI is a microbial enzyme from *Mycoplasma*, it has high affinity to arginine and catalyzes arginine to citrulline and ammonia. Citrulline can be recycled back to arginine in normal cells which express argininosuccinate synthetase 1 (ASS1). A pegylated form of ADI (ADI-PEG 20) has been formulated and shown in clinical trials for targeting arginine auxotrophic tumors by arginine deprivation therapy. Resistance to arginine deprivation is often developed through reactivation of ASS1.

WW domain-containing oxidoreductase (WWOX) gene has been found to be related to inhibition of tumor growth and/or invasion. Additionally, genetic variation in the human genome has been linked to treatment response and outcomes of specific cancers. For example, single nucleotide polymorphisms (SNPs) within certain genes, such as rs9679162-TT genotype in GALNT144 gene, has been found to link to unfavorable time-to-tumor progression (TTP) and overall survival (OS) in hepatocellular carcinoma (HCC) subjects (Lin et al., Asia Pac J. Clin. Oncol. 14(2): e54-e63 (2018)).

Accordingly, there exist in the related art a need of methods and kits for identifying SNPs associated with WWOX gene, in which these SNPs are suitable predicators for identifying tumor subjects suitable for arginine deprivation therapy.

SUMMARY OF THE INVENTION

The present disclosure is based on, at least in part, the discovery that polymorphisms within the WW domain-containing oxidoreductase (WWOX) gene are associated with the responsiveness or non-responsiveness of tumors (e.g., HCC) in patients to a pegylated form of ADI (ADI-PEG 20) based therapy. Therefore, the genotype of SNPs located at specific position(s) of the WWOX gene is/are predictive of the responsiveness or non-responsiveness of patients suffering from tumors to arginine deprivation therapy.

In one aspect, the present disclosure is directed to a method for identifying patients suffering from tumors (e.g., advanced HCC) responsive or non-responsive to treatment with arginine deprivation therapy based on the patient's WWOX genotype(s).

Examples of tumor that may be responsive to arginine deprivation therapy include, but are not limited to, breast cancer, brain tumor, colorectal cancer, head and neck squamous cell carcinoma, hepatocellular carcinoma (HCC), leukemia (e.g., acute myeloid leukemia (AML)), lung cancer, melanoma, mesothelioma (e.g., malignant pleural mesothelioma (MPM)), neuroblastoma, ovarian cancer, pancreatic cancer, prostate cancer, renal cell carcinoma, and sarcoma.

According to certain embodiments of the present disclosure, the patient has HCC, and the method comprises determining the presence of a G/G genotype of rs13338697 of the patient. Results provided in the examples of this application indicate that the presence of the G/G genotype of rs13338697 in HCC patients is positively associated with the prolonged overall survival (OS) of HCC patients receiving ADI-PEG 20, and therefore, the presence of the G/G genotype of rs13338697 is indicative that the HCC patient will respond to the arginine deprivation therapy.

The G/G genotype of rs13338697 is determined by amplifying a target nucleic acid comprising the afore-mentioned polymorphic site by using a forward primer of SEQ ID No: 1 or 2 and a reverse primer of SEQ ID No: 3.

According to embodiments of the present disclosure, the arginine deprivation therapy comprises administering to the patient an agent selected from the group consisting of difluoromethylornithine (DFMO), a recombinant arginine deiminase (rADI), a recombinant arginase (rArg), a recombinant arginine decarboxylase (rADC), a pegylated form of the rADI, the rArg, or the rADC, and a combination thereof. According to preferred embodiments of the present disclosure, the HCC patient having the G/G genotype of rs13338697 in WWOX gene is responsive to the arginine deprivation therapy, which comprises administering to the HCC patient a pegylated form of rADI (e.g., ADI-PEG 20).

Additionally or optionally, the arginine deprivation therapy may further include administering to the patient an arginine analog, an autophagy inhibitor, a chemotherapeutic agent, a MEK inhibitor, a tumor necrosis factor (TNF)-related apoptosis-inducing ligand (TRAIL), a vitamer, or a combination thereof. Examples of the autophagy inhibitor include, but are not limited to, bafilomycin A1, bortezomib, chloroquine (CQ), hydroxychloroquine (HCQ), 3-methyladenine (3-MA) and quinacrine. Examples of the chemotherapeutic agent include, but are not limited to, 5-fluororacil (5-FU), cisplatin, cytarabine, docetaxel, oxaliplatin, doxorubicin, methotrexate, and vincristine. Example of the arginine analog includes, but is not limited to, canavanine. Examples of the MEK inhibitor include, but are not limited to, trametinib (GSK1120212), cobimetinib (XL518), binimetinib (MEK162), selumetinib, PD-325901, CI-1040, PD035901, TAK-733, and U0126. Example of the vitamer includes, but is not limited to, folinic acid.

Additionally or optionally, the method further comprises determining the presence of a T/T genotype of rs6025211, which is negatively associated with the time-to-tumor progression (TTP) of HCC patients treated with arginine deprivation therapy, and therefore, the presence of the T/T genotype of rs6025211 is indicative that the HCC patient will not respond to the arginine deprivation therapy.

The T/T genotype of rs6025211 is determined by amplifying a target nucleic acid comprising the afore-mentioned polymorphic site by using a forward primer of SEQ ID No: 4 and a reverse primer of SEQ ID No: 5 or 6.

According to certain embodiments of the present disclosure, the arginine deprivation therapy comprises administering to the patient a combination of a pegylated form of rADI (e.g., ADI-PEG 20), folinic acid, 5-FU and oxaliplatin.

In another aspect, the present invention is related to a kit for predicting the responsiveness or non-responsiveness of a patient suffering from a tumor (e.g., HCC) to arginine deprivation therapy.

Examples of tumor that may be responsive to arginine deprivation therapy include, but are not limited to, breast cancer, brain tumor, colorectal cancer, head and neck squamous cell carcinoma, hepatocellular carcinoma (HCC), leukemia (e.g., acute myeloid leukemia (AML)), lung cancer, melanoma, mesothelioma (e.g., malignant pleural mesothelioma (MPM)), neuroblastoma, ovarian cancer, pancreatic cancer, prostate cancer, renal cell carcinoma, and sarcoma.

According to preferred embodiments of the present disclosure, the subject has HCC and the kit comprises a pair of primers suitable for amplifying a target nucleic acid comprising an SNP of WWOX gene in a biological sample derived from an HCC patient, wherein the SNP comprises rs13338697. In particular, the kit includes a first pair of primers comprising a first forward primer of SEQ ID No: 1 or 2, and a first reverse primer of SEQ ID No: 3 specifically for determining a G/G genotype of rs13338697, in which the presence of the G/G genotype of rs13338697 is indicative that the HCC patient will respond to the arginine deprivation therapy (e.g., a pegylated rADI).

Additionally or alternatively, the kit may further include additional primers suitable for amplifying a target nucleic acid encompassing the SNP of rs6025211. In particular, the kit further includes a second pair of primers comprising a second forward primer of SEQ ID No: 4 and a second reverse primer of SEQ ID No: 5 or 6 specifically for determining a T/T genotype of rs6025211, in which the presence of the T/T genotype of rs6025211 is indicative that the HCC patient will not respond to arginine deprivation therapy (e.g., a pegylated rADI, or a combination of the pegylated rADI, folinic acid, 5-FU, and oxaliplatin).

The kit also includes a label or a package insert on or associated with the kit. Specifically, the label or package insert provides instruction to a user how to use the kit and indicates that the kit is for identifying tumor patients (e.g., advanced HCC patients) responsive or non-responsive to treatment with arginine deprivation therapy based on the patient's WWOX genotype(s).

The details of one or more embodiments of this disclosure are set forth in the accompanying description below. Other features and advantages of the invention will be apparent from the detail descriptions, and from claims.

BRIEF DESCRIPTION OF THE DRAWINGS

The accompanying drawings, which are incorporated in and constitute a part of the specification, illustrate various example systems, methods and other exemplified embodiments of various aspects of the invention. The present description will be better understood from the following detailed description read in light of the accompanying drawings, where, FIG. 1 Analysis of clinicopathological factors and SNP genotypes in association with OS in patients receiving arginine deprivation therapy. Kaplan-Meyer analysis for subgroups of patients stratified by (A) WWOX-rs13338697, (B) rs6025211 and (C) GALNT14-rs9679162 genotypes. P values were obtained by log-rank test and <0.05 was considered as significant.

DETAILED DESCRIPTION OF THE PREFERRED EMBODIMENTS

Figure 1:
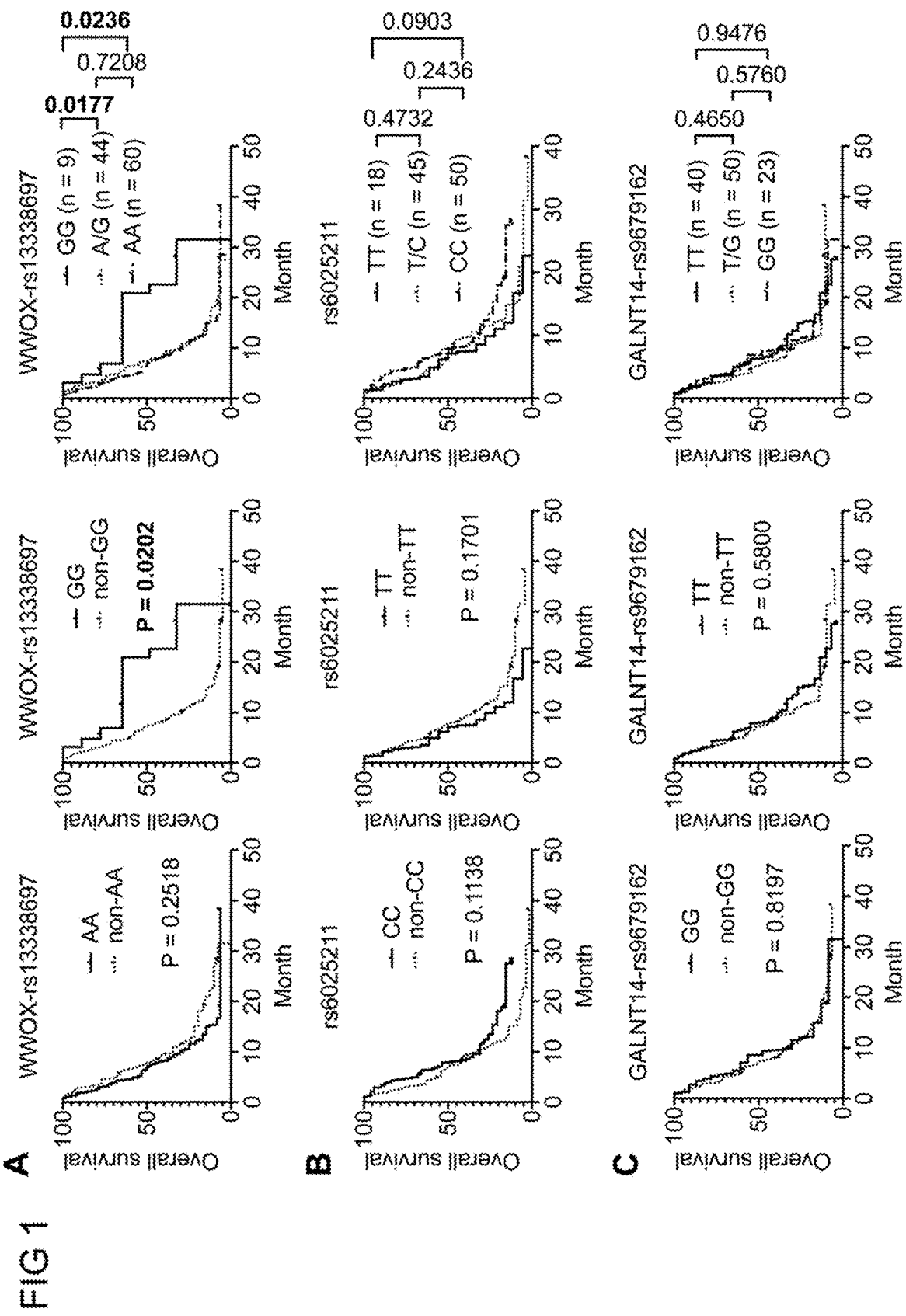

The detailed description provided below in connection with the appended drawings is intended as a description of the present disclosure and is not intended to represent the only forms in which the present disclosure may be constructed or utilized.

1. Definitions

As used herein, the term "hepatocellular carcinoma" (or "HCC" for short) refers to a malignant tumor of hepatocellular origin. HCC is a type of liver cancer. HCC may undergo hemorrhage and necrosis because of a lack of fibrous stroma. "Advanced hepatocellular carcinoma," refers to HCC that is not amenable to cure by local modalities of treatment, such as surgery or radiotherapy. Advanced HCC may refer to a locally advanced HCC or it may refer to metastatic HCC. The term "metastatic hepatocellular carcinoma" refers to HCC that has spread from liver to another part of the body. Advanced HCC may also be unresectable, that is, it has spread to surrounding tissue and cannot be surgically removed.

The term "nucleic acid" as used herein designates single- or double-stranded RNA, mRNA, and DNA including cDNA and genomic DNA. Unless specified otherwise, the left-hand end of single-stranded nucleotide sequences is the 5' end; and the right-hand end of single-stranded nucleotide sequences is the 3' end.

The term "polymorphism" as used herein refers to the occurrence of two or more alternative genomic sequences or alleles between or among different genomes or individuals. "Polymorphic" refers to the condition in which two or more variants of a specific genomic sequence can be found in a population. A "polymorphic site" is the locus at which the variation occurs. In the context of the present disclosure, a "single nucleotide polymorphism" (SNP) refers to a variation occurring when a single nucleotide in the genome (or other shared sequence) differs between members of a species. The SNPs listed in the present disclosure are referenced with a SNP identifier assigned by dbSNP of National Center for Biotechnology Information (US), and the variant nucleotides at the polymorphic position are indicated as the SNP on the antisense (non-coding) strand.

As used herein, the term "primer" refers to a single-stranded oligonucleotide capable of acting as a point of initiation of template-directed DNA synthesis under appropriate conditions (e.g., buffer, salt, temperature, and pH) in the presence of nucleotides and an agent for nucleic acid polymerization (e.g., a DNA-dependent or RNA-dependent polymerase). In the present disclosure, the sequence to be amplified is referred to as the "target nucleic acid." For the amplification of double-stranded DNA, a primer pair (i.e., a forward primer and a reverse primer) is often used so as to enable the amplification of both the coding and non-coding strands. According to common practice, the "forward primer" has a sequence substantially the same as a sequence of the upstream of the target nucleic acid of the coding strand such that the forward primer may hybridize (or anneal) with the non-coding strand. On the other hand, the "reverse primer" has a sequence substantially complementary to a sequence of the downstream of the target nucleic acid of the coding strand so that the reverse primer may hybridize (or anneal) with the coding strand.

The term "arginine deprivation therapy" refers to compounds or agents that remove the supply of arginine to cancers with disrupted urea cycle, thereby halt the growth of the cancers and induce cell death.

The term "prediction," in connection with the method/kit according to the invention for determining the responsiveness of a cancer subject to a therapy (e.g., arginine deprivation therapy) refers to the ability to foretell or infer whether a subject will respond in a positive manner, (e.g., whether a patient will be responsive) or a negative manner to the therapy. In one embodiment, the prediction relates to the extent of those responses. In another embodiment, the prediction relates to whether and/or the probability that a patient will survive or improve after treatment, and for a certain period of time without disease recurrence. For example, the predictive methods of the present disclosure may be used clinically to make treatment decisions by choosing the most appropriate treatment modalities for a particular patient. The predictive methods of the present disclosure are valuable tools in predicting whether a patient is likely to respond favorably to a treatment regimen, including for example, administration of a pegylated ADI (e.g., ADI-PEG 20), or the likelihood of long-term survival of the patient after a therapeutic regimen.

In the context of the present disclosure, the term "responsiveness" refers to a measurable response, including complete response (CR), partial response (PR), stable disease (SD) and progressive disease (PD). "Complete response" is intended to mean the complete disappearance of all target lesions without any residual lesion. It shall be noted that the complete response does not always mean the disease has been cured. "Partial response" refers to a ≥30% decrease in total tumor mass without progression in any target lesion or appearance of a new lesion. "Stable disease" is defined as either a <30% decrease or a <20% increase of total tumor mass. "Progressive disease" is meant a ≥20% increase in total tumor mass or appearance of a new lesion. Disease control is achieved in patients without progressive disease, and hence, patients with CR, PR, and SD are classified as "responders." By contrast, patients exhibiting progressive diseases are termed "non-responders."

As used herein, the term "survival", refers to the act or fact of living. The phrase "overall survival (OS)" refers to a prolongation in life expectancy as compared to naive or untreated individuals or patients.

The phrase "time-to-tumor response (TTR)" is defined as the time from the start of arginine deprivation therapy (e.g., ADI-PEG 20) to the first objective tumor response (tumor shrinkage of ≥30%) observed for patients who achieved a complete response (CR) or a partial response (PR).

The phrase "time-to-tumor progression (TTP)" was defined as the length of time from the date of diagnosis or the start of treatment for a disease (e.g., HCC) until the disease starts to get worse or spread to other parts of the body. In a clinical trial, measuring the time to progression is one way to see how well a new treatment works.

Unless otherwise indicated, the term "patient" or "subject" may be used interchangeably in the present disclosure, and refers to any animal. The animal can be a human subject. A subject can be one that has been identified as suffering from HCC, but has not yet received treatment therefor. Alternatively, a subject can be one that is not yet being identified as suffering or having a risk of developing HCC, thus has not yet received treatment therefor.

Unless otherwise indicated, the terms "treat," "treating" and "treatment" contemplate an action that occurs while a patient is suffering from the specified disease or disorder, which reduces the severity of the disease or disorder, or one or more of its symptoms, or retards or slows the progression of the disease or disorder.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

The singular forms "a", "and", and "the" are used herein to include plural referents unless the context clearly dictates otherwise.

2. Methods for Determining Responsiveness of Tumor Patients to Arginine Deprivation Therapy Diversity of cancer treatment responses has long been recognized, largely owing to the underlying heterogeneities in cancer biology, variations in physiological function and distinctions in patients' genetic profiles. Therefore, one objective of the present disclosure aims at providing molecular markers associated with the objective response or non-responsiveness of cancer patients to arginine deprivation therapy. Once identified, these molecular markers are useful in providing prognosis on the responsiveness or non-responsiveness of the cancer patient to arginine deprivation therapy, so that medical practitioners may choose suitable treatment regimen for the patient based on the prognosis outcome.

Examples of the tumor include, but are not limited to, breast cancer, brain tumor, colorectal cancer, head and neck squamous cell carcinoma, hepatocellular carcinoma (HCC), leukemia (e.g., acute myeloid leukemia (AML)), lung cancer, melanoma, mesothelioma (e.g., malignant pleural mesothelioma (MPM)), neuroblastoma, ovarian cancer, pancreatic cancer, prostate cancer, renal cell carcinoma, and sarcoma.

According to working embodiments of the present disclosure, genomes of HCC patients who had been through the course of an arginine deprivation therapy were screened. Specifically, the SNPs in WW domain-containing oxidoreductase (WWOX) gene, rs13338697 and intergenic SNP rs6025211, are identified. The analysis provided in working examples of the present disclosure demonstrated that rs13338697 is positively associated with the responsiveness of HCC patients to the arginine deprivation therapy; while the rs6025211 is negatively associated with the non-responsiveness of the HCC patients to arginine deprivation therapy. Therefore, the present invention is at least based on the discovery that one or more SNP of WWOX genes is suitable for use as a molecular marker, which is predictive of the responsiveness or non-responsiveness of HCC patients to arginine deprivation therapy (e.g., ADI-PEG 20).

In view of the foregoing, one aspect of the present disclosure is directed to a method for identifying HCC patients (e.g., advanced HCC) responsive or non-responsive to arginine deprivation therapy based on the patient's WWOX genotype(s).

According to embodiments of the present disclosure, the method comprises obtaining a biological sample (e.g., a serum sample) form the subject; and screening the biological sample for the presence of a G/G genotype of rs13338697 of WWOX gene. Results in working examples indicate that the presence of the G/G genotype is positively related to an improved OS of a monotherapy of ADI-PEG 20, and therefore, the presence of the G/G genotype of rs13338697 in the HCC patient indicates that this HCC patient will respond to the arginine deprivation therapy.

According to embodiments of the present disclosure, the G/G genotype of rs13338697 may be determined by a polymerase chain reaction (PCR) based method, which comprises amplifying a target nucleic acid comprising the afore-mentioned polymorphic site by use of a forward primer of SEQ ID No: 1 or 2 and a reverse primer of SEQ ID No: 3 in the PCR reaction. Specifically, the selected primer pair will hybridize under hybridization condition to the amplified portion of the target nucleic acid at the site comprising the SNP (i.e., G/G genotype), and the presence of the G/G genotype of rs13338697 indicates that the HCC patient will exhibit a positive response (i.e., an improved OS) to the arginine deprivation therapy.

According to embodiments of the present disclosure, the arginine deprivation therapy comprises administering to the patient (e.g., HCC patient) an agent selected from the group consisting of DFMO, rADI, rArg, rADC, a pegylated form of the rADI, the rArg, or the rADC, and a combination thereof. According to preferred embodiments of the present disclosure, the HCC patient having the G/G genotype of rs13338697 in WWOX gene is responsive to the arginine deprivation therapy, which comprises administering to the HCC patient a pegylated form of rADI (e.g., ADI-PEG 20) at a weekly dose of 18 $mg/m^2$ or 36 $mg/m^2$ until disease progression or unacceptable adverse event occurred or other withdrawal criteria met.

Additionally or optionally, the arginine deprivation therapy may further include administering to the patient an arginine analog, an autophagy inhibitor, a chemotherapeutic agent, a MEK inhibitor, TRAIL, a vitamer, or a combination thereof. Examples of the autophagy inhibitor include, but are not limited to, bafilomycin A1, bortezomib, CQ, HCQ, 3-MA and quinacrine. Examples of the chemotherapeutic agent include, but are not limited to, 5-FU, cisplatin, cytarabine, docetaxel, oxaliplatin, doxorubicin, methotrexate, and vincristine. Example of the arginine analog includes, but is not limited to, canavanine. Examples of the MEK inhibitor include, but are not limited to, trametinib (GSK1120212), cobimetinib (XL518), binimetinib (MEK162), selumetinib, PD-325901, CI-1040, PD035901, TAK-733, and U0126. Example of the vitamer includes, but is not limited to, folinic acid. In some embodiments, the arginine deprivation therapy is a combination of ADI-PEG 20 and TRAIL. In other embodiments, the arginine deprivation therapy is a combination of ADI-PEG 20 and cisplatin. In further embodiments, the arginine deprivation therapy is a combination of ADI-PEG 20 and cytarabine. In still further embodiments, the arginine deprivation therapy is a combination of ADI-PEG 20 and U0126. In some embodiments, the arginine deprivation therapy is a combination of ADI-PEG 20 and docetaxel. In other embodiments, the arginine deprivation therapy is a combination of ADI-PEG 20, folinic acid, 5-FU, and oxaliplatin. In further embodiments, the arginine deprivation therapy is a combination of rArg and 3-MA. In further embodiments, the arginine deprivation therapy is a combination of rArg and CQ.

Additionally or optionally, the method further comprises determining the presence of a T/T genotype of rs6025211 of the target nucleic acid in the biological sample. Results in working examples of the present disclosure demonstrated that the T/T genotype of rs6025211 is negatively associated with the ADI-PEG 20 based therapy, in which an unfavorable TTP is linked to the presence of T/T genotype of rs6025211 in HCC subjects treated with the arginine deprivation therapy.

According to embodiments of the present disclosure, the T/T genotype of rs6025211 is determined by amplifying the target nucleic acid comprising the afore-mentioned polymorphic site by using a forward primer of SEQ ID No: 4 and a reverse primer of SEQ ID No: 5 or 6. Specifically, the selected primer pair will hybridize under hybridization condition to the amplified portion of the target nucleic acid at the site comprising the SNP (i.e., T/T genotype), and the presence of the T/T genotype of rs6025211 indicates that the HCC patient will not respond to arginine deprivation therapy, in which a shorter TTP is found to positively related to the presence of the T/T genotype of rs6025211 compared to those without the indicated genotype.

Alternatively, the presence of the desired genotypes at the specified position of WWOX gene may be determined by other conventional techniques and equivalents thereof. Examples of the known techniques include, but are not limited to, restriction fragment length polymorphisms (RFLP) analysis, invader assay, single nucleotide primer extension, TaqMan assay, dynamic allele-specific hybridization (DASH), molecular beacon assay, direct sequencing, electrophoresis, temperature gradient gel electrophoresis, and single-stranded conformation polymorphism (SSCP) analysis.

3. Kits for Determining Responsiveness of Cancer Patients to Arginine Deprivation Therapy In view of the foregoing, another aspect of the present disclosure is directed to a kit for identifying single nucleotide polymorphisms of a target nucleic acid in a biological sample derived from a cancer patient (e.g., HCC patients) for the prognosis on whether the patient will respond to arginine deprivation therapy.

According to embodiments of the present disclosure, the kit is useful for identifying the presence or absence of one or more SNPs of a target nucleic acid of a patient suffering from a tumor, such as breast cancer, brain tumor, colorectal cancer, head and neck squamous cell carcinoma, hepatocellular carcinoma (HCC), leukemia (e.g., acute myeloid leukemia (AML)), lung cancer, melanoma, mesothelioma (e.g., malignant pleural mesothelioma (MPM)), neuroblastoma, ovarian cancer, pancreatic cancer, prostate cancer, renal cell carcinoma, and sarcoma.

Generally, the target nucleic acid may be derived from clinical samples collected from the patients, such as serum samples. The kit may comprise materials for amplifying the target sequence that encompasses at least one polymorphic site of WWOX gene, and means for identifying the genotype at the polymorphic sites.

According to preferred embodiments of the present disclosure, the kit comprises a first pair of primers for amplifying a target nucleic acid comprising rs13338697 of WWOX gene of the patient. For example, the target nucleic acid comprising rs13338697 may be amplified by a forward primer of SEQ ID No: 1 or 2 and a reverse primer of SEQ ID No: 3 in the PCR reaction, in which the selected primer pair will hybridize under hybridization condition to the amplified portion of the target nucleic acid at the site comprising the SNP (i.e., G/G genotype). According to working examples of the present disclosure, the presence of the G/G genotype of rs13338697 indicates that the patient will exhibit a positive response (i.e., an improved OS) to arginine deprivation therapy.

In some embodiments, the target nucleic acid may encompass one polymorphic site; while in other embodiments, the target nucleic acid may encompass two or more polymorphic sites. In such cases, the kit may further comprise a second pair of primers for amplifying SNPs of rs6025211 in the target nucleic acid. Specifically, the second pair of primers are for amplifying the target nucleic acid comprising a T/T genotype of rs6025211 in the biological sample. The T/T genotype of rs6025211 is amplified by use of a forward primer of SEQ ID No: 4 and a reverse primer of SEQ ID No: 5 or 6, in which the selected primer pair will hybridize under hybridization condition to the amplified portion of the target nucleic acid at the site comprising the T/T genotype. Results in working examples of the present disclosure demonstrated that the T/T genotype of rs6025211 is negatively associated with the arginine deprivation therapy, in which an unfavorable TTP is linked to the presence of the T/T genotype of rs6025211 in the cancer subjects treated with the arginine deprivation therapy.

According to embodiments of the present disclosure, the presence of the T/T genotype of rs6025211 indicates that the patient will not respond to arginine deprivation therapy, in which a shorter TTP is found to be positively related to the presence of the T/T genotype of rs6025211 compared to those without the indicated genotype.

Still optionally, the kit may comprise an instruction for interpreting the results. The instruction may be included in the kit in either printed or electronic form. Alternatively, the instruction can be provided by way of a link or internet address that provides access to instructions located on either an internet or extranet site. The internet site can be either publicly available or secure. In particular, the instruction may dictate that the presence of a specified genotype at a specified position predicts complete or partial response of the tumor (e.g., HCC) of the patient. In one embodiment, the specified genotype at the specified position comprises G/G genotype of rs13338697 of WWOX gene. Optionally, the specified genotype at the specified position comprises the T/T genotype of rs6025211.

The present invention will now be described more specifically with reference to the following embodiments, which are provided for the purpose of demonstration rather than limitation. While they are typically of those that might be used, other procedures, methodologies, or techniques known to those skilled in the art may alternatively be used.

EXAMPLES

Materials and Methods

Cell Culture

The human HCC cell lines, including J7, Huh7, HepG2, and Mahlavu cells, and the human breast cancer cell lines, including BT20, MDA-MB-231, MDA-MB-435s, MDA-MB-468, and MCF-7 were respectively obtained from American Type Culture Collection (ATCC). Among them, J7, BT20, MDA-MB-231, MDA-MB-435s, and MDA-MB-468 cells were WWOX-rs13338697 G/G genotype (WWOX GG type); while Huh7, HepG2, Mahlavu, and MCF-7 cells were WWOX-rs13338697 non-G/G phenotype (WWOX non-GG type).

J7, Huh7, Mahlavu, and MDA-MB-468 cells were cultured in Dulbecco's Modified Eagle's Medium (DMEM) supplemented with 10% fetal bovine serum (FBS) and 1% penicillin-streptomycin in 37° C. humidified incubator with 5% $CO_2$. HepG2 cells were cultured in Minimum Essential Medium a (MEM a) supplemented with 10% FBS and 1% penicillin-streptomycin in 37° C. humidified incubator with 5% $CO_2$. BT20 and MCF-7 cells were cultured in Roswell Park Memorial Institute-1640 (PRMI-1640) growth medium supplemented with 10% FBS and 1% penicillin-streptomycin in 37° C. humidified incubator with 5% $CO_2$. MDA-MB-231 and MDA-MB-435s cells were cultured in DMEM/F12 supplemented with 10% FBS and 1% penicillin-streptomycin in 37° C. humidified incubator with 5% $CO_2$.

MTT Assay

MTT assay is a colorimetric assay that measures the activity of enzymes (i.e., reductase) that reduce 3-(4,5-dimethylthiazol-2yl)-2,5-diphenyltetrazoliumbromide (MTT), a yellow tetrazole, to purple formazan, in living cells. This reduction only takes place when cells are alive; hence, MTT assay is generally used to assess the viability and proliferation of cells. Briefly, $3 \times 10^3$ cells were seeded into each well of a 96-well plate at least 16 hours prior to subsequent procedures. Cells were treated with ADI-PEG 20 at the indicated dose for one to three days. Subsequently, the MTT dye (Bio basic, USA) was added into each well of the 96-well plate and the reaction was allowed to proceed for 3 hours. The relative cell viability was assessed by measuring the absorbance of each well at 590 nm and normalized using the absorbance obtained from those without ADI-PEG 20 treatment.

Immunoblotting

Cells with or without ADI-PEG 20 treatment were harvested and lysed for total cellular protein extraction. Protein concentration was assessed using the BCA Protein Assay kit (Thermo Fisher Scientific, Waltham, MA). The protein extracts were loaded into SDS-polyacrylamide gel electrophoresis, and the separated proteins were transferred to PVDF membranes. The proteins on the PVDF membrane were targeted by the specific primary and HRP-conjugated secondary antibodies. The protein signal detection was conducted using a ECL kit (Millipore Corporation, Billerica, MA). Images were acquired by exposing the luminescent signals to an X-ray film.

Patient Enrollment

The serum samples from patients receiving arginine-deprivation therapy were used in this study. Patients enrolled in the present study were diagnosed with advanced stage of HCC and had joined the clinical trial of ADI-PEG 20 in Taiwan previously (NCT01287585). Specifically, the patients received ADI-PEG 20 monotherapy (weekly dose of 18 mg/m$^2$, until disease progression or unacceptable adverse event occurred or other withdrawal criteria met) The de-linked samples and clinicopathological parameters were used for post hoc analysis.

Therapeutic Outcomes Evaluation

The duration of overall survival (OS) was calculated from the date of patients included for randomization to the date of death, regardless of any causes, or the date of losing follow-up. The objective tumor response was evaluated according to the Response Evaluation Criteria in Solid Tumors criteria (Eisenhauer et al., Eur J Cancer 2009, 45, 228-247). Object with ≥30% decrease in tumor volume, without progression in any target lesion or appearance of a new lesion was defined as response. The duration of time-to-tumor response (TTR) was derived from the date of patients included for randomization to the date of tumor response, which was censored at the date of leaving trial. Progressive disease was defined as a ≥20% increase in total tumor volume or appearance of a new lesion. The duration of time-to-tumor progression (TTP) was calculated from the date of patients included for randomization to the date of disease progression, which was censored at the date of last radiological assessment.

SNP Genotyping

Isolation of cell-free genomic DNA from serum samples was achieved using QIAamp DNA mini kit (QIAGEN Co. Ltd., MD, USA) according to the instruction provided by the manufacturer. The semi-nested polymerase chain reaction (PCR) was conducted using primers listed in Table 1. The EasyPrep Gel & PCR extraction kit (BIOTOOLS Co. Ltd., New Taipei City, Taiwan) was used to clean the PCR products according to procedures provided by the manufacturer. The purified PCR product was then sent for Sanger's sequencing for genotyping.

TABLE 1

Primers used for genotyping of SNP

| Name of Primer | Sequence (5'→3') | SEQ ID NO |
|---|---|---|
| rs13338697-F1 | 5'-ACTTCTGACAGCCATCCAGA-3' | 1 |
| rs13338697-F2 | 5'-ATCCTGCTAGCATGTTGACT-3' | 2 |
| rs13338697-R2 | 5'-ACTGTAGATGCCTTCCATCT-3' | 3 |
| rs6025211-F1 | 5'-ACATTCACAGAGAACTTGGC-3' | 4 |
| rs6025211-R1 | 5'-CAAGCAGTCCTTCCACCTTG-3' | 5 |
| rs6025211-R2 | 5'-AAAGTGCTGGGATTACAGGT-3' | 6 |
| rs9679162-F1 | 5'-TCACGAGGCCAACATTCTAG-3' | 7 |
| rs9679162-R1 | 5'-TTAGATTCTGCATGGCTCAC-3' | 8 |
| rs9679162-R2 | 5'-TCCCTCCTACTGAACCTCTCC-3' | 9 |

Statistical Analysis

Dichotomized data was expressed as ratios (%) and compared by use of $\chi^2$ or Fisher's exact test. Parametric data was expressed as mean±standard deviation and compared by use of two-sampled t-test. Nonparametric data or data not in normal distribution was expressed as median (range) and compared by Mann-Whitney test. Univariate and multivariate Cox proportional hazard models were used to estimate survivals in relationship to clinical and genotypic variables. After categorization, Kaplan-Meier (KM) method was employed to estimate the survival probability between groups, and log-rank test was used to compare the survivals. A $p<0.05$ was considered statistically significant. Statistical analysis was conducted using SPSS (version 18.0) or Prism (version 8.0).

EXAMPLES

Example 1 Baseline Characteristics of Patients in the Present Study

A total of 113 patients with advanced stage HCC and treated with ADI-PEG 20 were included in this study. The baseline clinical and genotypic characteristics of these patients were summarized in Table 2.

TABLE 2

Baseline clinicopathological parameters and SNP genotypes of the enrolled patients

| Clinical variables | Patients (n = 113) |
|---|---|
| Age, mean ± SD | 58.5 ± 11.5 |
| Gender, male, n (%) | 96 (85.0%) |
| Anti-HBV, positive, n (%) | 80 (70.8%) |
| Anti-HCV, positive, n (%) | 29 (25.7%) |
| Tumor number, n (%) | |
| 1 | 1 (0.9%) |
| 2 | 16 (14.2%) |
| 3 | 13 (11.5%) |

TABLE 2-continued

Baseline clinicopathological parameters and
SNP genotypes of the enrolled patients

| Clinical variables | Patients (n = 113) |
|---|---|
| 4 | 33 (29.2%) |
| >4 | 50 (44.2%) |
| Largest tumor size, mm, mean + SD | 58.6 ± 36.9 |
| AFP, ng/mL, median (range) | 530.0 (1.8-1022847.2) |
| Albumin, g/dL, mean ± SD | 4.0 ± 0.5 |
| Bilirubin, mg/dL, mean ± SD | 0.8 ± 0.4 |
| Creatin, mg/dL, mean + SD | 0.8 ± 0.2 |
| AST, U/L, mean ± SD | 68.3 ± 37.2 |
| ALT, U/L, mean ± SD | 48.9 ± 31.8 |
| OS, month, mean + SD | 8.7 ± 7.1 |
| TTR, month, mean ± SD | 3.6 ± 2.4 |
| TTP, month, mean + SD | 3.1 ± 3.2 |
| GALNT14-rs9679162-TT, n (%) | 40 (35.4%) |
| GALNT14-rs9679162-GG, n (%) | 23 (20.4%) |
| WWOX-rs13338697-AA, n (%) | 60 (53.1%) |
| WWOX-rs13338697-GG, n (%) | 9 (8.0%) |
| rs6025211-TT, n (%) | 18 (15.9%) |
| rs6025211-CC, n (%) | 50 (44.2%) |

AFP, alpha-fetoprotein;
AST, aspartate aminotransferase;
ALT, alanine aminotransferase;
OS, overall survival;
TTR, time-to-tumor response;
TTP, time-to-tumor progression..

Example 2 Correlation of Clinicopathological Factors and SNP Genotypes with OS, TTR and TTP in Advanced HCC Patients Receiving Arginine Deprivation Therapy To investigate whether any parameter, including baseline characteristics listed in Table 2 and SNP genotypes, was correlated with OS, TTR and TTP in patients included, analyses using COX proportional hazard model were performed, followed by Kaplan-Meier (KM) analysis.

Univariate analysis showed that patients with tumor number ≤4 had a longer OS compared with those with tumor number >4 (mean OS, 10.6 months [95% CI: 8.5-12.7] versus 6.2 months [95% CI: 5.0-7.3]; P=0.001). Additionally, patients with WWOX-rs13338697 G/G genotype had a longer OS compared with those with non-G/G genotype (mean OS, 15.1 months [95% CI: 6.7-23.4] versus 8.1 months [95% CI: 6.8-9.3], P=0.025) (Table 3). Furthermore, these two factors were independent predictors for OS in patients receiving arginine deprivation therapy (adjusted P value=0.003 and 0.045, respectively). This finding was then confirmed by Kaplan-Meyer analysis, which showed that tumor number and WWOX-rs13338697 genotypes could serve as independent factors to predict OS in these patients (FIG. 1, panel (A)). However, genotypes of rs6025211 and GALNT14-rs9679162 had no predictive value for OS (FIG. 1, panels (B) and (C)).

Figure 2:
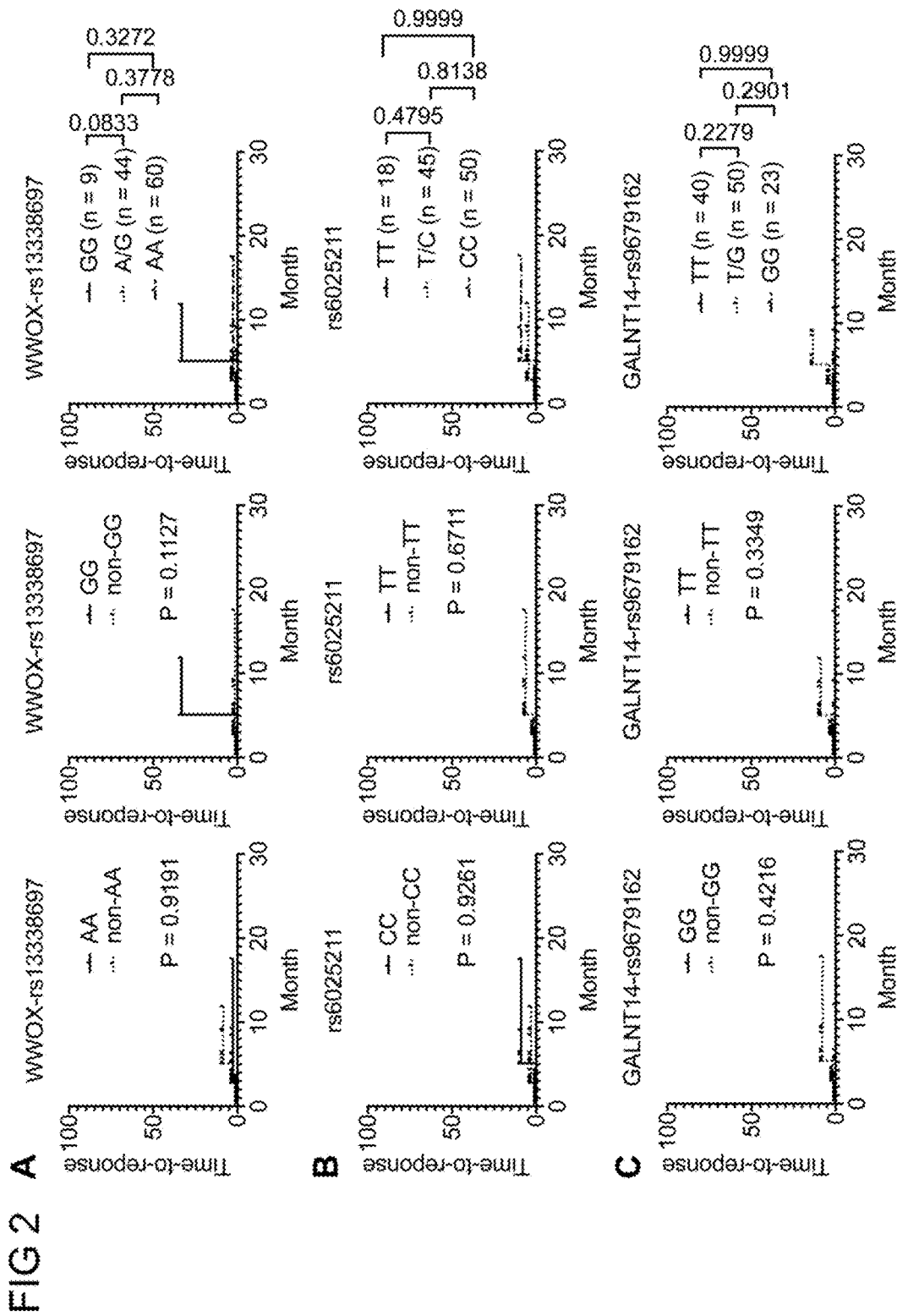
FIG. 2 Analysis of SNP genotypes in association with TTR in patients receiving arginine deprivation therapy. Kaplan-Meyer analysis of subgroups of patients stratified by (A) WWOX-rs13338697, (B) rs6025211, and (C) GALNT14-rs9679162 genotypes. P values were obtained by log-rank test and <0.05 was considered as significant.

Similar analyses were also performed to understand whether these factors were associated with TTR and TTP in those included patients. Unfortunately, there was no correlation between any of the parameters and TTR was found, using either COX proportional hazard model (Table 4) or Kaplan-Meyer analysis (FIG. 2).

Figure 3:
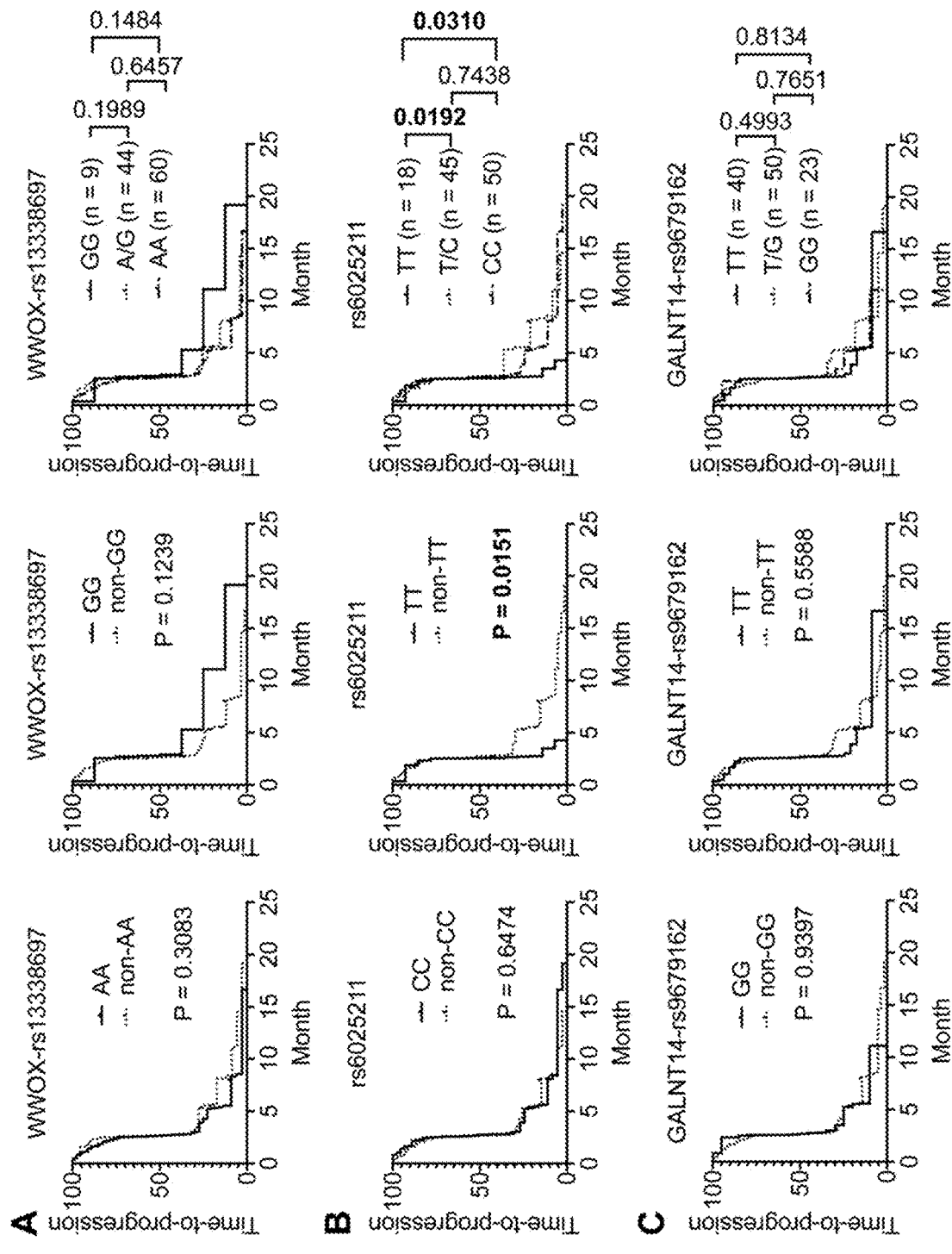
FIG. 3 Analysis of clinicopathological factors and SNP genotypes in association with TTP in patients receiving arginine deprivation therapy. Kaplan-Meyer analysis of subgroups of patients stratified by (A) WWOX-rs13338697, (B) rs6025211, and (C) GALNT14-rs9679162 genotypes. P values were obtained by log-rank test and <0.05 was considered as significant.

However, intriguingly, the tumor number and another factor, rs6025211 T/T genotype, were found to correlate with TTP using univariate analysis in COX proportional hazard model (Table 5, P=0.011 and 0.021 respectively). Patients with tumor number >4 was associated with a shorter TTP when compared with those with tumor number ≤4 (mean TTP, 2.1 months [95% CI: 1.7-2.5] versus 3.8 months [95% CI: 2.8-4.8]). For rs6025211 genotypes, patients with T/T genotype had a shorter TTP when compared with those with non-T/T genotype (mean TTP, 2.0 months [95% CI: 1.3-2.6] versus 3.3 months [95% CI: 2.6-4.0]). Multivariate analysis using COX proportional hazard model further demonstrated that these two factors were independent predictors for TTP in these patients (P=0.007 and 0.012, respectively). Kaplan-Meyer analysis also revealed distinguishable stratification of patients by use of tumor number (P=0.0076) or rs6025211 T/T (P=0.0151 when compared to non-T/T) in these patients (FIG. 3). No association was found for other SNP genotypes (FIG. 3).

Taken together, the WWOX-rs13338697 G/G and rs6025211 T/T genotypes could predict outcomes of arginine deprivation therapy independent of clinicopathological parameter, such as tumor number.

TABLE 3

Univariate and multivariate analysis of clinicopathological factors and SNP genotypes
in relationship to OS in 113 HCC patients receiving arginine deprivation therapy.

| | | Univariate analysis | | | Multivariate analysis | |
|---|---|---|---|---|---|---|
| Parameters | N | Mean OS (95% CI) | HR (95% CI) | P* | Adjusted HR (95% CI) | P# |
| Age (years) | | | | | | |
| >60.7 | 57 | 9.0 (7.1-11.0) | | | | |
| ≤60.7 | 56 | 8.3 (6.4-10.1) | 1.118 (0.753-1.659) | 0.581 | | |
| Gender | | | | | | |
| Male | 96 | 8.4 (7.1-9.7) | | | | |
| Female | 17 | 10.0 (4.8-15.1) | 0.908 (0.521-1.582) | 0.734 | | |
| Anti-HBV | | | | | | |
| Positive | 80 | 8.4 (6.9-9.9) | | | | |
| Negative | 33 | 9.3 (6.6-12.1) | 0.962 (0.624-1.482) | 0.861 | | |
| Anti-HCV | | | | | | |
| Positive | 29 | 9.6 (6.5-12.8) | | | | |
| Negative | 84 | 8.3 (6.9-9.8) | 1.244 (0.783-1.976) | 0.356 | | |

TABLE 3-continued

Univariate and multivariate analysis of clinicopathological factors and SNP genotypes
in relationship to OS in 113 HCC patients receiving arginine deprivation therapy.

| Parameters | N | Univariate analysis | | | Multivariate analysis | |
|---|---|---|---|---|---|---|
| | | Mean OS (95% CI) | HR (95% CI) | P* | Adjusted HR (95% CI) | P# |
| Tumor number | | | | | | |
| >4 | 50 | 6.2 (5.0-7.3) | | | | |
| ≤4 | 63 | 10.6 (8.5-12.7) | 0.504 (0.333-0.763) | 0.001 | 0.531 (0.350-0.803) | 0.003 |
| Largest tumor size | | | | | | |
| >47.0 (mm) | 55 | 7.3 (5.9-8.8) | | | | |
| ≤47.0 (mm) | 58 | 9.9 (7.7-12.0) | 0.698 (0.468-1.040) | 0.077 | | |
| AFP (ng/mL) | | | | | | |
| >530.0 | 56 | 7.8 (6.0-9.5) | | | | |
| ≤530.0 | 57 | 9.4 (7.5-11.6) | 0.792 (0.533-1.175) | 0.246 | | |
| Albumin (g/dL) | | | | | | |
| >4.0 | 52 | 9.5 (7.5-11.6) | | | | |
| ≤4.0 | 61 | 7.9 (6.2-9.6) | 1.136 (0.766-1.684) | 0.526 | | |
| Bilirubin (mg/dL) | | | | | | |
| >0.7 | 51 | 7.8 (5.8-9.8) | | | | |
| ≤0.7 | 62 | 9.4 (7.6-11.2) | 0.813 (0.548-1.207) | 0.304 | | |
| Creatin (mg/dL) | | | | | | |
| >0.8 | 62 | 8.7 (7.0-10.5) | | | | |
| ≤0.8 | 51 | 8.5 (6.5-10.6) | 0.979 (0.659-1.454) | 0.916 | | |
| AST (U/L) | | | | | | |
| >61.0 | 56 | 7.6 (5.7-9.5) | | | | |
| ≤61.0 | 57 | 9.7 (7.8-11.5) | 0.721 (0.485-1.070) | 0.105 | | |
| ALT (U/L) | | | | | | |
| >39.0 | 56 | 9.1 (7.1-11.0) | | | | |
| ≤39.0 | 57 | 8.3 (6.4-10.1) | 1.211 (0.816-1.796) | 0.342 | | |
| rs9679162 | | | | | | |
| TT | 40 | 9.0 (6.8-11.2) | | | | |
| Non-TT | 73 | 8.5 (6.8-10.1) | 1.123 (0.743-1.698) | 0.581 | | |
| rs9679162 | | | | | | |
| GG | 23 | 9.4 (6.4-12.3) | | | | |
| Non-GG | 90 | 8.5 (7.0-10.0) | 1.057 (0.657-1.699) | 0.820 | | |
| rs13338697 | | | | | | |
| AA | 60 | 7.7 (6.0-9.4) | | | | |
| Non-AA | 53 | 9.7 (7.6-11.8) | 0.794 (0.535-1.180) | 0.254 | | |
| rs13338697 | | | | | | |
| GG | 9 | 15.1 (6.7-23.4) | | | | |
| Non-GG | 104 | 8.1 (6.8-9.3) | 2.617 (1.128-6.069) | 0.025 | 2.381 (1.021-5.552) | 0.045 |
| rs6025211 | | | | | | |
| TT | 18 | 7.3 (4.5-10.1) | | | | |
| Non-TT | 95 | 8.9 (7.4-10.4) | 0.701 (0.420-1.169) | 0.173 | | |
| rs6025211 | | | | | | |
| CC | 50 | 9.5 (7.5-11.6) | | | | |
| Non-CC | 63 | 8.0 (6.2-9.7) | 1.380 (0.923-2.063) | 0.116 | | |

Median value was used as cutoff for parametric data.
OS, overall survival;
HR, hazard ratio;
CI, confidence interval;
N, number of patients.
*P value derived from univariate analysis of COX proportional hazard model.
P value derived from multivariate analysis of COX proportional hazard model by using tumor number and rs13338697-GG as covariables.
All P value <0.05 was considered as significant.

TABLE 4

Univariate and multivariate analysis of clinicopathological factors and SNP genotypes in relationship to TTR in HCC patients treated with arginine deprivation therapy.

| Parameters | N | Mean TTR (95% CI) | HR (95% CI) | P* |
|---|---|---|---|---|
| *Univariate analysis* | | | | |
| Age (years) | | | | |
| >60.7 | 57 | 3.9 (3.1-4.6) | | |
| ≤60.7 | 56 | 3.3 (2.7-3.8) | 1.225 (0.078-20.094) | 0.872 |
| Gender | | | | |
| Male | 96 | 3.6 (3.1-4.1) | | |
| Female | 17 | 3.5 (2.7-4.2) | 4.986 (0.308-80.662) | 0.258 |
| Anti-HBV | | | | |
| Positive | 80 | 3.4 (3.0-3.9) | | |
| Negative | 33 | 4.0 (2.9-5.1) | 0.027 (0.000-7443.8) | 0.572 |
| Anti-HCV | | | | |
| Positive | 29 | 4.6 (3.2-5.9) | | |
| Negative | 84 | 3.2 (2.8-3.6) | 43.516 (0.000-7262314.5) | 0.539 |
| Tumor number | | | | |
| >4 | 50 | 2.9 (2.5-3.3) | | |
| ≤4 | 63 | 4.1 (3.4-4.8) | 39.036 (0.000-17669739.8) | 0.581 |
| Largest tumor size | | | | |
| >47.0 (mm) | 55 | 3.2 (2.8-3.7) | | |
| ≤47.0 (mm) | 58 | 3.9 (3.1-4.6) | 56.381 (0.001-5182028.3) | 0.489 |
| AFP (ng/mL) | | | | |
| >530.0 | 56 | 3.6 (2.9-4.4) | | |
| ≤530.0 | 57 | 3.5 (3.0-4.0) | 63.716 (0.001-5627590.6) | 0.475 |
| Albumin (g/dL) | | | | |
| >4.0 | 52 | 3.7 (2.9-4.4) | | |
| ≤4.0 | 61 | 3.5 (2.9-4.0) | 0.775 (0.048-12.388) | 0.857 |
| Bilirubin (mg/dL) | | | | |
| >0.7 | 51 | 3.6 (2.9-4.2) | | |
| ≤0.7 | 62 | 3.6 (3.0-4.2) | 1.004 (0.061-16.507) | 0.998 |
| Creatin (mg/dL) | | | | |
| >0.8 | 62 | 3.6 (3.0-4.2) | | |
| ≤0.8 | 51 | 3.5 (2.8-4.2) | 1.425 (0.089-22.922) | 0.803 |
| AST (U/L) | | | | |
| >61.0 | 56 | 3.6 (2.8-4.3) | | |
| ≤61.0 | 57 | 3.6 (3.0-4.1) | 57.701 (0.001-5198836.7) | 0.486 |
| ALT (U/L) | | | | |
| >39.0 | 56 | 4.0 (3.2-4.7) | | |
| ≤39.0 | 57 | 3.2 (2.8-3.7) | 125.705 (0.001-21134467.6) | 0.431 |
| rs9679162 | | | | |
| TT | 40 | 3.6 (2.6-4.5) | | |
| Non-TT | 73 | 3.6 (3.1-4.1) | 37.128 (0.000-10261440.2) | 0.572 |
| rs9679162 | | | | |
| GG | 23 | 3.9 (2.9-4.8) | | |
| Non-GG | 90 | 3.5 (3.0-4.0) | 31.131 (0.000-29130090.9) | 0.624 |
| rs13338697 | | | | |
| AA | 60 | 3.4 (2.7-4.0) | | |
| Non-AA | 53 | 3.8 (3.2-4.4) | 0.866 (0.054-13.945) | 0.919 |
| rs13338697 | | | | |
| GG | 9 | 4.5 (2.2-6.8) | | |
| Non-GG | 104 | 3.5 (3.0-4.0) | 0.144 (0.009-2.324) | 0.172 |
| rs6025211 | | | | |
| TT | 18 | 2.7 (2.2-3.3) | | |
| Non-TT | 95 | 3.7 (3.2-4.3) | 25.920 (0.000-489400000000) | 0.787 |

TABLE 4-continued

Univariate and multivariate analysis of clinicopathological
factors and SNP genotypes in relationship to TTR in HCC
patients treated with arginine deprivation therapy.

| | | Univariate analysis | | |
|---|---|---|---|---|
| Parameters | N | Mean TTR (95% CI) | HR (95% CI) | P* |
| rs6025211 | | | | |
| CC | 50 | 4.0 (3.3-4.7) | | |
| Non-CC | 63 | 3.2 (2.7-3.8) | 1.140 (0.071-18.237) | 0.926 |

Median value was used as cutoff for parametric data.
TTR, time-to-tumor response;
HR, hazard ratio;
CI, confidence interval;
N, number of patients.
*P value derived from univariate analysis of COX proportional hazard model.
P value <0.05 was considered as significant.

TABLE 5

Univariate and multivariate analysis of clinicopathological factors and SNP genotypes
in relationship to TTP in HCC patients receiving arginine deprivation therapy

| | | Univariate analysis | | | Multivariate analysis | |
|---|---|---|---|---|---|---|
| Parameters | N | Mean TTP (95% CI) | HR (95% CI) | P | Adjusted HR (95% CI) | P |
| Age (years) | | | | | | |
| >60.7 | 57 | 3.4 (2.6-4.3) | | | | |
| ≤60.7 | 56 | 2.7 (1.9-3.5) | 1.171 (0.765-1.794) | 0.467 | | |
| Gender | | | | | | |
| Male | 96 | 3.1 (2.4-3.8) | | | | |
| Female | 17 | 3.1 (2.0-4.2) | 1.126 (0.642-1.973) | 0.679 | | |
| Anti-HBV | | | | | | |
| Positive | 80 | 3.0 (2.3-3.7) | | | | |
| Negative | 33 | 3.2 (2.1-4.3) | 1.038 (0.661-1.632) | 0.572 | | |
| Anti-HCV | | | | | | |
| Positive | 29 | 3.8 (2.5-5.2) | | | | |
| Negative | 84 | 2.8 (2.2-3.5) | 1.169 (0.732-1.868) | 0.512 | | |
| Tumor number | | | | | | |
| >4 | 50 | 2.1 (1.7-2.5) | | | | |
| ≤4 | 63 | 3.8 (2.8-4.8) | 0.550 (0.347-0.870) | 0.011 | 0.531 (0.336-0.839) | 0.007 |
| Largest tumor size | | | | | | |
| >47.0 (mm) | 55 | 2.8 (2.2-3.5) | | | | |
| ≤47.0 (mm) | 58 | 3.3 (2.3-4.3) | 0.798 (0.518-1.230) | 0.307 | | |
| AFP (ng/ml) | | | | | | |
| >530.0 | 56 | 2.8 (2.0-3.6) | | | | |
| ≤530.0 | 57 | 3.3 (2.5-4.2) | 0.839 (0.549-1.282) | 0.416 | | |
| Albumin (g/dL) | | | | | | |
| >4.0 | 52 | 3.3 (2.3-4.2) | | | | |
| ≤4.0 | 61 | 2.9 (2.1-3.7) | 0.935 (0.611-1.432) | 0.757 | | |
| Bilirubin (mg/dL) | | | | | | |
| >0.7 | 51 | 2.9 (2.0-3.9) | | | | |
| ≤0.7 | 62 | 3.2 (2.5-3.9) | 1.271 (0.819-1.972) | 0.286 | | |
| Creatin (mg/dL) | | | | | | |
| >0.8 | 62 | 3.3 (2.4-4.1) | | | | |
| ≤0.8 | 51 | 2.9 (2.1-3.6) | 1.275 (0.834-1.950) | 0.262 | | |
| AST (U/L) | | | | | | |
| >61.0 | 56 | 3.1 (2.2-3.9) | | | | |
| ≤61.0 | 57 | 3.1 (2.3-3.9) | 0.906 (0.592-1.386) | 0.649 | | |

TABLE 5-continued

Univariate and multivariate analysis of clinicopathological factors and SNP genotypes in relationship to TTP in HCC patients receiving arginine deprivation therapy

| | | Univariate analysis | | | Multivariate analysis | |
|---|---|---|---|---|---|---|
| Parameters | N | Mean TTP (95% CI) | HR (95% CI) | P | Adjusted HR (95% CI) | P |
| ALT (U/L) | | | | | | |
| >39.0 | 56 | 3.3 (2.4-4.2) | | | | |
| ≤39.0 | 57 | 2.8 (2.1-3.6) | 1.286 (0.839-1.973) | 0.248 | | |
| rs9679162 | | | | | | |
| TT | 40 | 2.7 (1.7-3.6) | | | | |
| Non-TT | 73 | 3.3 (2.5-4.1) | 0.877 (0.558-1.379) | 0.570 | | |
| rs9679162 | | | | | | |
| GG | 23 | 3.1 (2.1-4.1) | | | | |
| Non-GG | 90 | 3.1 (2.4-3.8) | 0.981 (0.558-1.638) | 0.941 | | |
| rs13338697 | | | | | | |
| AA | 60 | 2.7 (2.0-3.4) | | | | |
| Non-AA | 53 | 3.5 (2.5-4.5) | 0.807 (0.527-1.234) | 0.322 | | |
| rs13338697 | | | | | | |
| GG | 9 | 5.2 (0.5-9.9) | | | | |
| Non-GG | 104 | 2.9 (2.4-3.4) | 1.816 (0.824-4.002) | 0.139 | | |
| rs6025211 | | | | | | |
| TT | 18 | 2.0 (1.3-2.6) | | | | |
| Non-TT | 95 | 3.3 (2.6-4.0) | 0.496 (0.274-0.898) | 0.021 | 0.467 (0.258-0.845) | 0.012 |
| rs6025211 | | | | | | |
| CC | 50 | 3.5 (2.5-4.5) | | | | |
| Non-CC | 63 | 2.8 (2.0-3.5) | 1.102 (0.719-1.690) | 0.656 | | |

Median value was used as cutoff for parametric data.
TTP, time-to-tumor progression;
HR, hazard ratio;
CI, confidence interval;
N, number of patients.
*P value derived from univariate analysis of COX proportional hazard model.
P value derived from multivariate analysis of COX proportional hazard model by using tumor number and rs6025211-TT as covariables.
P value <0.05 was considered as significant.

Example 3 ADI-PEG 20 Inhibited Cell Growth in WWOX-Rs13338697 G/G Genotype Cancer Cells In this example, the effect of ADI-PEG 20 on viability of cancer cells, including WWOX-rs13338697 G/G type and non-G/G type, was evaluated by MTT assay. Results are illustrated in FIGS. 4 and 5.

Figure 4:
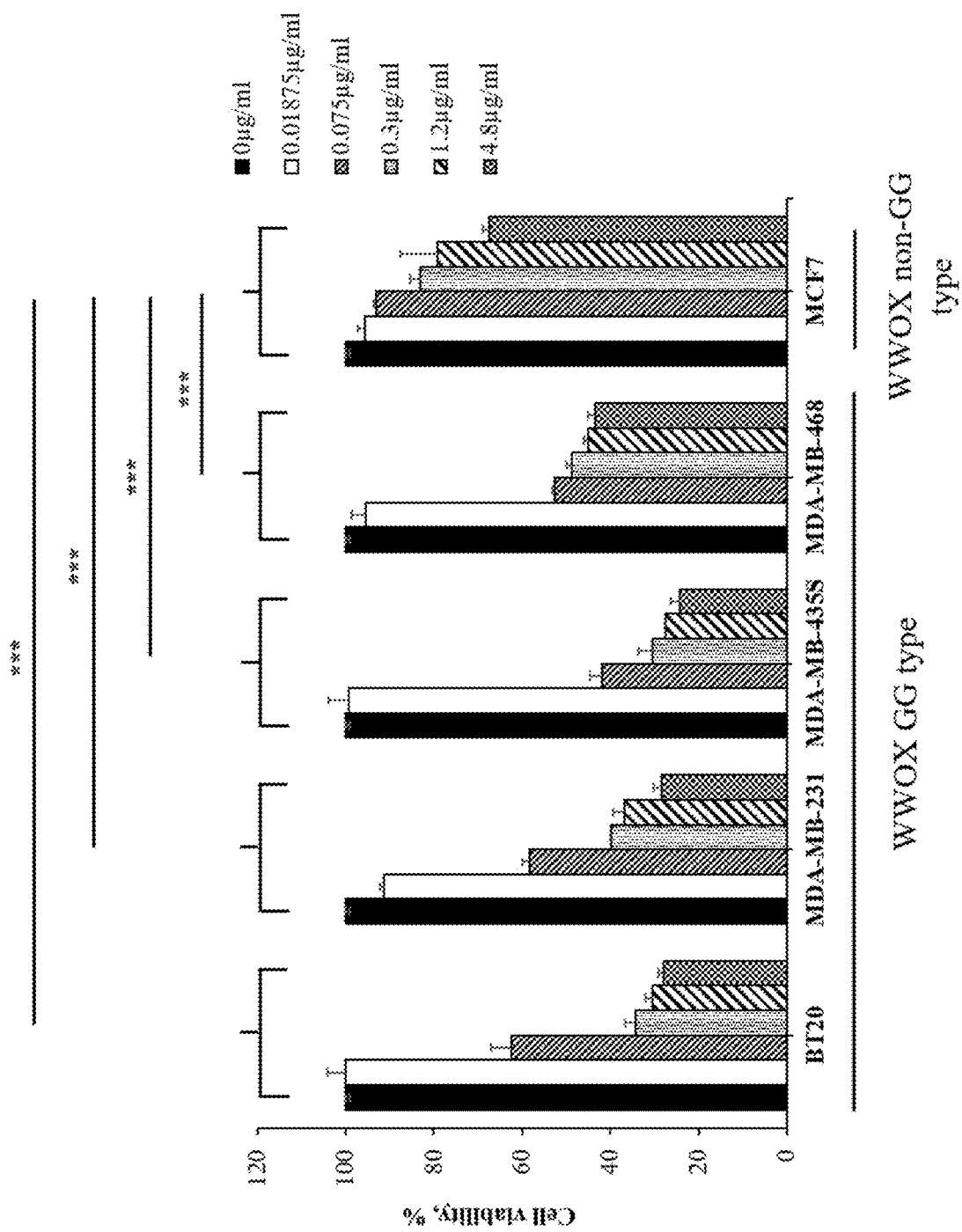
FIG. 4 Effects of ADI-PEG 20 on cell viability in WWOX-rs13338697 G/G type and non-G/G type breast cancer cells. WWOX-rs13338697 G/G type and non-G/G type breast cancer cells were treated with various concentrations of ADI-PEG 20 (0-4.8 μg/mL) for 72 hours, and the cell viability was assessed by MTT assay. Data represent means±standard error of the mean (SEM) (n=3, *p<0.05, p<0.01, *p<0.001). P value was acquired by the two-tailed ANOVA.
Figure 5:
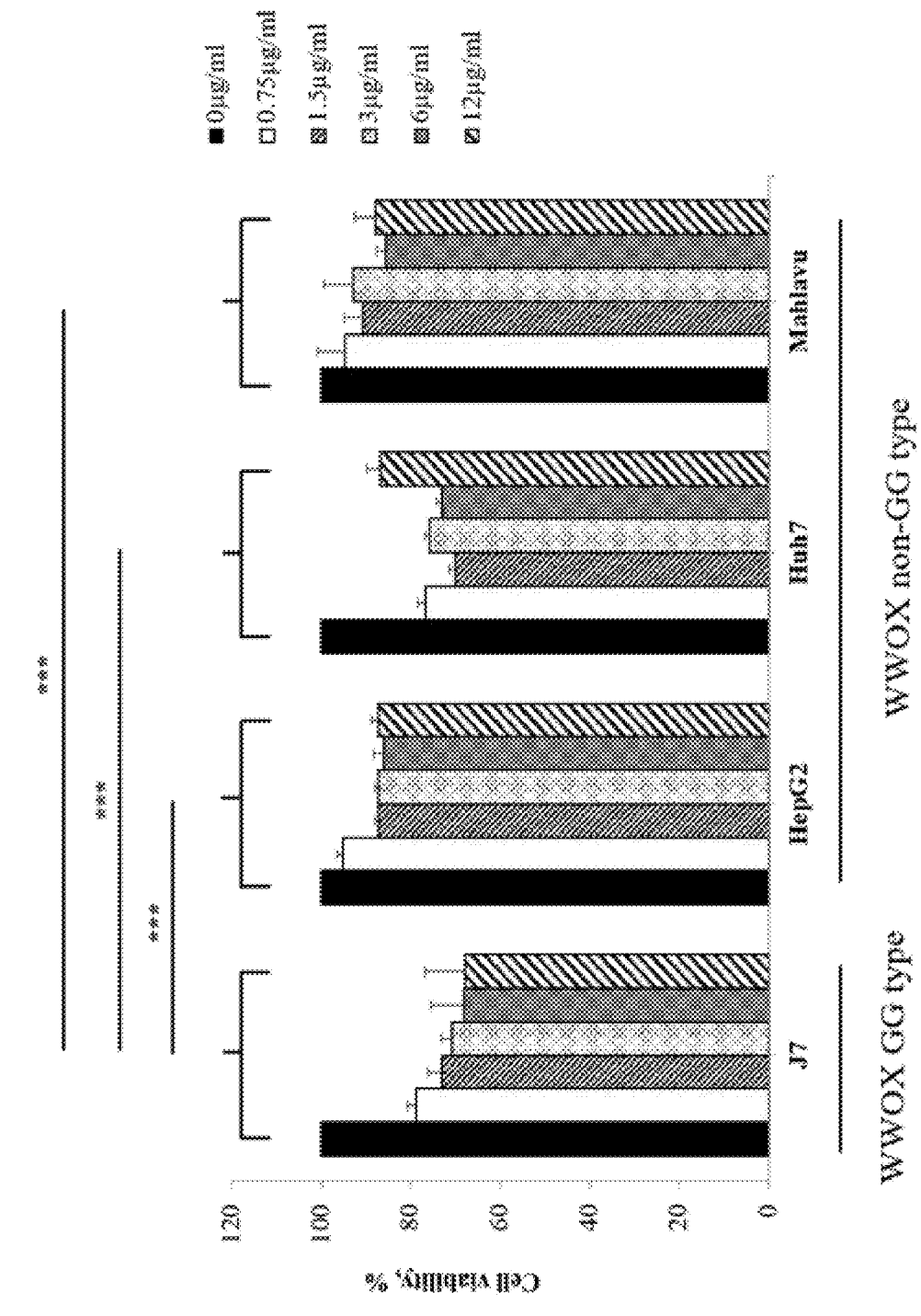
FIG. 5 Effects of ADI-PEG 20 on cell viability in WWOX-rs13338697 G/G type and non-G/G type hepatocellular carcinoma (HCC) cells. WWOX-rs13338697 G/G type and non-G/G type HCC cells were treated with various concentrations of ADI-PEG 20 (0-12 μg/ml) for 72 hours, and the cell viability was assessed by MTT assay. Data represent means±standard error of the mean (SEM) (n=3, *p<0.05, p<0.01, *p<0.001). P value was acquired by the two-tailed ANOVA.

It was found that ADI-PEG 20 possessed strong inhibitory effect towards the growth of breast cancer cell lines with WWOX-rs13338697 G/G genotype, including BT20, MDA-MB-231, MDA-MB-435s, and MDA-MB-468 cells, as compared to those with non-G/G genotype, such as MCF-7 cells (FIG. 4). Similar results were also found in HCC cells, in which the HCC cell lines with WWOX-rs13338697 G/G genotype, such as J7 cells, exhibited a better responsiveness to ADI-PEG 20 treatment than these with non-G/G genotype HCC cell lines, such as Huh7, HepG2, and Mahlavu cells (FIG. 5). Further, it was unexpectedly found that the cell viability of Huh7 cells treated with high dose ADI-PEG 20 (12 μg/mL) was in fact higher than that of cells treated with lower dose of ADI-PEG 20 (e.g., 0.75, 1.5, 3, or 6 μg/mL), which suggested that the non-GG type HCC cells might have become resistant to ADI-PEG 20 treatment.

Taken together, these results confirmed that WWOX-rs13338697 G/G genotype cancer cells would have better response to ADI-PEG 20 treatment than those with non-G/G genotype cancer cells.

Figure 6:
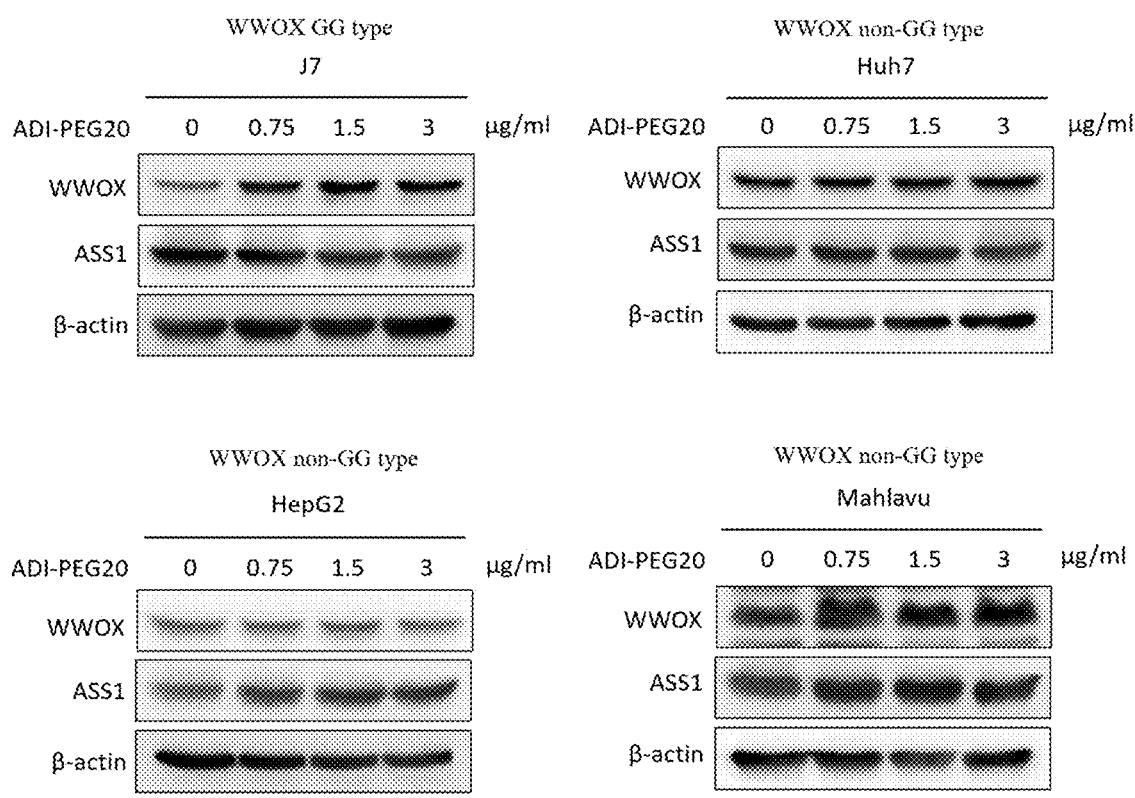
FIG. 6 ADI-PEG 20 significantly upregulates WWOX expression and downregulates ASS1 expression in WWOX-rs13338697 G/G type cancer cells. Representative immunoblot of WWOX, ASS1, and j-actin in WWOX-rs13338697 G/G type and non-G/G type HCC cells treated with various concentrations of ADI-PEG 20 (0, 0.75, 1.5, 3 μg/mL) for 24 hours. At least three biological triplicates were assayed for all independent experiments.

Example 4 ADI-PEG 20 Increased Expression of WWOX and Decreased Expression of ASS1 in WWOX-Rs13338697 G/G Genotype Cancer Cells In this example, the effects of ADI-PEG 20 on the expression of WWOX and ASS1 proteins in cancer cells with WWOX-rs13338697 G/G and non-G/G genotypes were examined. Results are illustrated in FIG. 6.

It was found that ADI-PEG 20 treatment significantly increased WWOX protein expression in WWOX-rs13338697 G/G genotype HCC cell lines such as J7, as compared to those with non-G/G genotype HCC cell lines, such as Huh7, HepG2, and Mahlavu. By contrast, decreased expression of ASS1 was found in WWOX-rs13338697 G/G genotype HCC cell lines such as J7 treated with ADI-PEG 20, as compared to those with non-G/G genotype HCC cell lines, such as Huh7, HepG2, and Mahlavu (FIG. 6). Further, increased expression of ASS1 was also found in HepG2 and Mahlavu cells after ADI-PEG 20 treatment, indicating that the non-G/G genotype HCC cells might have become resistant to ADI-PEG 20 treatment. Results in this example confirmed that ADI-PEG 20 exerted its action on the inhibition of cell growth in WWOX-rs13338697 G/G genotype cancer cells through increasing WWOX and decreasing ASS1 proteins expression.

Taken together, the present disclosure identifies WWOX-rs13338697 as an independent predictor for OS in patients receiving arginine deprivation therapy. Also, rs6025211 was found to be a TTP predictor for arginine deprivation therapy.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of the present disclosure.

What is claimed is:

1. A method for treating a subject suffering from a tumor comprising,
   obtaining a nucleic acid-containing sample from the subject;
   detecting the presence of a G/G genotype of rs13338697 in a target nucleic acid of the nucleic acid-containing sample by use of a polymerase chain reaction (PCR)-based method, wherein the PCR-based method comprises,
   amplifying the target nucleic acid in the nucleic acid-containing sample by a first forward primer of SEQ ID No: 1 or 2 and a first reverse primer of SEQ ID No: 3; and
   subjecting the subject to an arginine deprivation therapy when the G/G genotype of rs13338697 is present in the target nucleic acid.

2. The method of claim 1, the tumor is selected from the group consisting of breast cancer, brain tumor, colorectal cancer, head and neck squamous cell carcinoma, hepatocellular carcinoma (HCC), leukemia, acute myeloid leukemia (AML), lung cancer, melanoma, mesothelioma, malignant pleural mesothelioma (MPM), neuroblastoma, ovarian cancer, pancreatic cancer, prostate cancer, renal cell carcinoma, and sarcoma.

3. The method of claim 2, wherein the arginine deprivation therapy comprises administering to the subject an effective amount of an agent selected from the group consisting of difluoromethylornithine (DFMO), a recombinant arginine deiminase (rADI), a recombinant arginase (rArg), a recombinant arginine decarboxylase (rADC), a pegylated form of the rADI, the rArg, or the rADC, and a combination thereof.

4. The method of claim 3, wherein the arginine deprivation therapy further comprises administering to the subject an arginine analog, an autophagy inhibitor, a chemotherapeutic agent, a MEK inhibitor, a tumor necrosis factor (TNF)-related apoptosis-inducing ligand (TRAIL), a vitamer, or a combination thereof.

5. The method of claim 4, wherein
   the autophagy inhibitor is selected from the group consisting of bafilomycin Al, bortezomib, chloroquine (CQ), hydroxychloroquine (HCQ), 3-methyladenine (3-MA) and quinacrine;
   the chemotherapeutic agent is 5-fluororacil (5-FU), cisplatin, cytarabine, docetaxel, oxaliplatin, doxorubicin, methotrexate, or vincristine;
   the arginine analog is canavanine;
   the MEK inhibitor is trametinib (GSK1120212), cobimetinib (XL518), binimetinib (MEK162), selumetinib, PD-325901, CI-1040, PD035901, TAK-733, or U0126; and
   the vitamer is folinic acid.

* * * * *